US012718408B2

(12) United States Patent
Park et al.

(10) Patent No.: US 12,718,408 B2
(45) Date of Patent: Aug. 25, 2026

(54) CAMERA CALIBRATION METHOD AND APPARATUS

(71) Applicant: Samsung Electronics Co., Ltd., Suwon-si (KR)

(72) Inventors: Yonggonjong Park, Suwon-si (KR); Daeul Park, Suwon-si (KR); Moonsub Byeon, Suwon-si (KR); Seho Shin, Suwon-si (KR); Jaewook Yoo, Suwon-si (KR); Jaewoo Lee, Suwon-si (KR); Sung Hyun Chung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 253 days.

(21) Appl. No.: 18/432,712

(22) Filed: Feb. 5, 2024

(65) Prior Publication Data

US 2025/0022172 A1 Jan. 16, 2025

(30) Foreign Application Priority Data

Jul. 12, 2023 (KR) ........................ 10-2023-0090567

(51) Int. Cl.
*G06T 7/80* (2017.01)
*G06T 7/12* (2017.01)
(Continued)

(52) U.S. Cl.
CPC .................. *G06T 7/80* (2017.01); *G06T 7/12* (2017.01); *G06V 10/40* (2022.01); *G06V 20/588* (2022.01); *G06T 2207/30244* (2013.01)

(58) Field of Classification Search
CPC ... G06T 7/80; G06T 2207/30252; G06T 7/85; G06T 3/4038; G06T 2207/30256; G06T 2207/10016; G06T 2207/10028; G06T 7/73; G06T 7/74; G06T 2207/30244; G06T 7/246; G06T 2207/20076; G06T 2207/20164; G06T 2207/30196;
(Continued)

(56) References Cited

U.S. PATENT DOCUMENTS 8,842,181 B2 * 9/2014 Kosaki ..................... H04N 7/18
348/148
9,028,312 B1 * 5/2015 Wei ......................... A63F 13/28
463/2
(Continued)

FOREIGN PATENT DOCUMENTS

JP 7226930 B2 2/2023
KR 10-1979422 B1 5/2019
(Continued)

*Primary Examiner* — Alex Kok S Liew
(74) *Attorney, Agent, or Firm* — NSIP Law

(57) ABSTRACT

A method and apparatus for calibrating a camera are provided. The method and apparatus include obtaining a driving image captured by a camera mounted on a vehicle, segmenting line regions including straight lines from the captured driving image, extracting feature points of the straight lines from the line regions, projecting the feature points of the straight lines into a world coordinate system, and estimating an error for a calibration parameter of the camera including at least one of a pitch, a roll, or a yaw so that the feature points projected into the world coordinate system satisfy a line parallel condition.

21 Claims, 8 Drawing Sheets

(51) Int. Cl.
*G06V 10/40* (2022.01)
*G06V 20/56* (2022.01)

(58) Field of Classification Search
CPC . G06T 2207/30232; G06T 2207/30236; G06T 7/0002; G06T 7/13; G06T 7/521; G06T 7/593; G06T 2207/20084; G06T 2207/30201; G06T 2207/30268; G06T 7/11; G06T 7/12; B60R 11/04; B60R 2300/105; B60R 2300/303; B60R 2300/402; B60R 1/27; G06V 20/56; G06V 20/588; G06V 20/40; G06V 10/457; G06V 10/26; G06V 10/40; G06V 10/82; G06V 20/58; G06V 20/582; G06V 20/625; G06V 20/63; G06V 2201/08
See application file for complete search history.

(56) References Cited

U.S. PATENT DOCUMENTS

| | | | | |
|---|---|---|---|---|
| 11,398,051 | B2 | 7/2022 | Lee et al. | |
| 2007/0255133 | A1* | 11/2007 | Suhling | G06T 7/11 600/425 |
| 2020/0167578 | A1* | 5/2020 | Ding | G06V 20/58 |
| 2020/0250470 | A1* | 8/2020 | Kim | H04N 23/661 |
| 2022/0366604 | A1 | 11/2022 | Park et al. | |
| 2023/0027728 | A1 | 1/2023 | Byeon | |

FOREIGN PATENT DOCUMENTS

| | | | |
|---|---|---|---|
| KR | 10-2022402 | B1 | 9/2019 |
| KR | 10-2022-0153802 | A | 11/2022 |
| KR | 10-2023-0015114 | A | 1/2023 |

* cited by examiner

CAMERA CALIBRATION METHOD AND APPARATUS

CROSS-REFERENCE TO RELATED APPLICATIONS

This application claims the benefit under 35 USC § 119 (a) of Korean Patent Application No. 10-2023-0090567, filed on Jul. 12, 2023, in the Korean Intellectual Property Office, the entire disclosure of which is incorporated herein by reference for all purposes.

BACKGROUND

1. Field

The following description relates to a camera calibration method and apparatus.

2. Description of Related Art

Cameras are typically implemented in various fields such as autonomous driving (AD) and advanced driver assistance systems (ADAS). When a camera is mounted on a vehicle, camera calibration may be basically performed and coordinate system transformation information to transform a vehicle coordinate system and a camera coordinate system may be obtained through the camera calibration. The coordinate system transformation information may be used to implement various operations for AD and ADAS, for example, an operation of estimating a pose of the vehicle and an operation of estimating a distance to the vehicle ahead.

However, when deformation occurs in an initial state in which the calibration is performed due to a change in tire air pressure, a change in a vehicle pose, a change in the number of passengers on board, and the like, a position or angle of a camera may be changed, and there may thus be a difference between an actual image and a captured image.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a processor-implemented method includes obtaining a driving image captured by a camera mounted on a vehicle; segmenting line regions comprising straight lines from the captured driving image; extracting feature points of the straight lines from the line regions; projecting the feature points of the straight lines into a world coordinate system; and estimating an error for a calibration parameter of the camera comprising at least one of a pitch, a roll, or a yaw so that the feature points projected into the world coordinate system satisfy a line parallel condition.

The obtaining of the driving image may include determining whether front lines recognized in the driving image are the straight lines; and obtaining the driving image based on a result of the determining that the front lines are the straight lines.

The determining of whether the front lines are the straight lines may include modeling the front lines with a polynomial; and determining whether the front lines are the straight lines by determining a coefficient of higher-order terms of 2nd-order or more in the polynomial.

The obtaining of the driving image may include determining whether the vehicle is in a translational motion or a rotational motion; and obtaining the driving image based on a determination that the vehicle is in the translational motion.

The determining of whether the vehicle is in the translational motion may include determining whether the vehicle is in the translational motion based on at least one of a measured value of an inertial measurement unit (IMU) mounted on the vehicle, a wheel velocity of the vehicle, or a steering angle of the vehicle.

The line parallel condition may include at least one of a first condition in which, among the feature points projected into the world coordinate system, front distances of two feature points corresponding to a same height of straight lines facing each other are equal; a second condition in which, among the projected feature points, widths between two feature points facing each other in four feature points of a quadrangular shape are equal; and a third condition in which, among the four feature points, y coordinates of center points of two feature points facing each other are equal.

The feature points of the straight lines may include two feature points corresponding to the same height of straight lines facing each other, and the estimating of the error may include calculating front distances to a front of the vehicle from each of the two feature points projected into the world coordinate system; and estimating an error of the roll so that the front distances satisfy the first condition.

The feature points of the straight lines may include four feature points of a quadrangular shape located on straight lines facing each other, and the estimating of the error may include calculating widths between two feature points facing each other corresponding to straight lines facing each other among the four feature points projected into the world coordinate system; and estimating an error of the pitch so that the widths satisfy the second condition.

The feature points of the straight lines may include four feature points of a quadrangular shape located on straight lines facing each other, and the estimating of the error may include calculating coordinates of center points of two feature points facing each other corresponding to straight lines facing each other among the four feature points projected into the world coordinate system; and estimating an error of the yaw so that the coordinates of the center points satisfy the third condition.

The method may include calibrating the calibration parameter of the camera while the vehicle is driving based on the error of the calibration parameter of the camera.

In a general aspect, an apparatus includes a camera configured to capture a driving image of a vehicle; and a processor configured to segment line regions comprising straight lines from the captured driving image of the vehicle, extract feature points of the straight lines from the line regions, project the feature points of the straight lines into a world coordinate system, and estimate an error of a calibration parameter of the camera comprising at least one of a pitch, a roll, or a yaw so that the feature points projected into the world coordinate system satisfy a line parallel condition.

The processor may be configured to determine whether front lines recognized in the driving image are the straight lines and obtain the driving image based on a result of the determination that the front lines are the straight lines.

The processor may be configured to model the front lines with a polynomial and determine whether the front lines are the straight lines by determining a coefficient of higher-order terms of 2nd-order or more in the polynomial.

The processor may be configured to determine whether the vehicle is in a translational motion based on at least one of a measured value of an inertial measurement unit (IMU) mounted on the vehicle, a wheel velocity of the vehicle, or a steering angle of the vehicle and obtain the driving image based on a determination that the vehicle is in the translational motion.

The line parallel condition may include at least one of a first condition in which, among the feature points projected into the world coordinate system, front distances of two feature points corresponding to a same height of straight lines facing each other are equal; a second condition in which, among the projected feature points, widths between two feature points facing each other in four feature points of a quadrangular shape are equal; and a third condition in which, among the four feature points, y coordinates of center points of two feature points facing each other are equal.

The feature points of the straight lines may include two feature points corresponding to the same height of straight lines facing each other, and the processor may be configured to calculate front distances to a front of the vehicle from each of the two feature points projected into the world coordinate system and estimate an error of the roll so that the front distances satisfy the first condition.

The feature points of the straight lines may include four feature points of a quadrangular shape located on straight lines facing each other, and the processor may be configured to calculate widths between two feature points facing each other corresponding to straight lines facing each other among the four feature points projected into the world coordinate system and estimate an error of the pitch so that the widths satisfy the second condition.

The feature points of the straight lines may include four feature points of a quadrangular shape located on straight lines facing each other, and the processor is configured to calculate coordinates of center points of two feature points facing each other corresponding to straight lines facing each other among the four feature points projected into the world coordinate system and estimate an error of the yaw so that the coordinates of the center points satisfy the third condition.

The processor may be configured to calibrate the calibration parameter of the camera while the vehicle is driving based on the error of the calibration parameter of the camera.

In a general aspect, a processor-implemented method includes capturing an image of a road surface with a camera disposed in a vehicle; detecting a predetermined pattern on the road surface from the captured image; obtaining one or more calibration parameters of the camera; and estimating an error of the one or more calibration parameters of the camera while the vehicle is in motion based on a condition in which a result of projecting the detected pattern in the driving image into a world coordinate system using a calibration value and the detected lines are straight lines; wherein the calibration parameters are at least one of a pitch, a roll, and a yaw.

The method may include determining whether the predetermined pattern are straight lines by modeling the predetermined pattern with a polynomial and determining a coefficient of higher-order terms of 2nd-order or more in the polynomial.

Other features and aspects will be apparent from the following detailed description, the drawings, and the claims.

Figure 1:
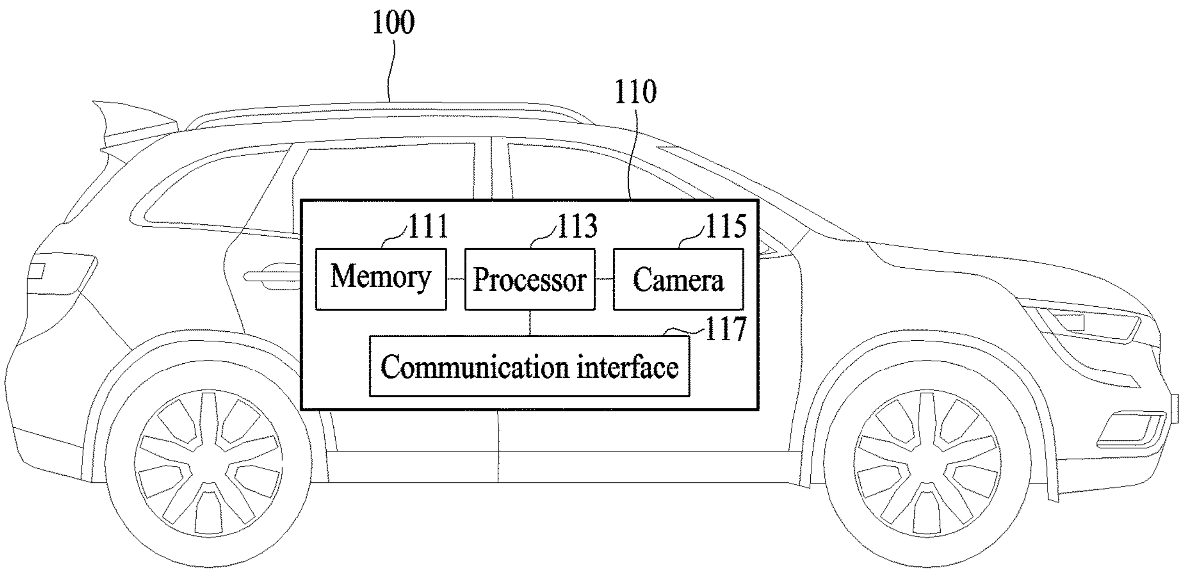
FIG. 1 illustrates an example camera calibration apparatus, in accordance with one or more embodiments.

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment, e.g., as to what an example or embodiment may include or implement, means that at least one example or embodiment exists where such a feature is included or implemented, while all examples are not limited thereto. The use of the terms "example" or "embodiment" herein have a same meaning, e.g., the phrasing "in one example" has a same meaning as "in one embodiment", and "one or more examples" has a same meaning as "in one or more embodiments."

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

Throughout the specification, when a component or element is described as being "on", "connected to," "coupled to," or "joined to" another component, element, or layer it may be directly (e.g., in contact with the other component, element, or layer) "on", "connected to," "coupled to," or "joined to" the other component, element, or layer or there may reasonably be one or more other components, elements, layers intervening therebetween. When a component, element, or layer is described as being "directly on", "directly connected to," "directly coupled to," or "directly joined" to another component, element, or layer there can be no other components, elements, or layers intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

Unless otherwise defined, all terms, including technical and scientific terms, used herein have the same meaning as commonly understood by one of ordinary skill in the art to which this disclosure pertains and specifically in the context on an understanding of the disclosure of the present application. Terms, such as those defined in commonly used dictionaries, are to be interpreted as having a meaning that is consistent with their meaning in the context of the relevant art and specifically in the context of the disclosure of the present application, and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

The examples to be described below may be used, as only examples, to mark a lane line in an augmented reality navigation system of a smart vehicle and the like or generate visual information to assist the steering of an autonomous vehicle. Additionally, the examples may be used to assist safe and comfortable driving by interpreting visual information through a device including an intelligent system, such as a head up display (HUD) that is installed in a vehicle for driving assistance or fully autonomous driving. The examples may be applied to, as only examples, autonomous vehicles, intelligent vehicles, smartphones, mobile devices, and the like.

FIG. 1 illustrates an example camera calibration apparatus, in accordance with one or more embodiments.

Referring to FIG. 1, an example vehicle 100 including an example camera calibration apparatus 110 is illustrated.

The vehicle 100 may include all types of means of vehicular transportation that travels or operates on a road or track. The vehicle 100 may include, as non-limited examples, an automobile, a motorcycle, a bicycle, and the like, and the automobile may include various types such as, but not limited to, a passenger car, a freight vehicle, and a two-wheeled vehicle. For example, the vehicle 100 may include a vehicle on which an advanced driver assistance system (ADAS), a driving assistance system, and/or an automated driving system (ADS) may be mounted and that recognizes and determines some situations while driving using sensors, an image processing device, and/or a communication device and controls operations of the vehicle or notifies a driver of the situations. The vehicle 100 described herein may refer to an 'ego vehicle' on which the camera calibration apparatus 110 is mounted.

The camera calibration apparatus 110 may include a memory 111, a processor 113, a camera 115, and a communication interface 117.

The camera calibration apparatus 110 may perform camera calibration by detecting a predetermined pattern such as lines marked on the road surface. In an example, the road surface may correspond to a road surface on which the vehicle 100 drives or to a test site or a road surface of a test road before the vehicle 100 is released. The 'driving road' may refer to a road on which the ego vehicle is driving. The 'road' may refer to a road on which vehicles drive and may include, for example, various types of roads, such as a highway, national highway, local road, high-speed national highway, and automobile-only road, as only examples. The 'lane' may refer to a road space separated from another road space through lines marked on the road surface. Hereinafter, the 'driving lane' may refer to a lane on which a current vehicle is driving among lanes, and may be understood to be a lane space that is occupied and used by the ego vehicle. The driving lane may also be referred to as an 'ego lane'. One lane may be separated from lines on the left and right of lanes. The 'line(s)' may refer to a solid line or a broken line marked on the road surface to distinguish between lanes.

The predetermined pattern may be, for example, a standardized road surface mark on the driving road, such as, as an example, lines. Alternatively, the predetermined pattern may be a recognition pattern or a pattern board for calibration that knows the three-dimensional (3D) interval of each point. The recognition pattern or the pattern board for calibration may be used at the time point of initial calibration. Information on at least one of the shape, size, length, or area of a corresponding mark in the predetermined pattern may be stored in the camera calibration apparatus 110 and used in calibration operations that are described below. The predetermined pattern may further include, for example, a crosswalk line, a heading direction mark, a permitted left-turn mark, an indication sign, and the like, in addition to lines. However, examples of the predetermined pattern are not limited to the foregoing examples, and the description of the one or more examples may also be applied to various standardized road surface marks that may vary by country or region.

The camera calibration apparatus 110 may estimate an error that may occur due to the difference between the initial calibration time point and the driving time point by performing camera calibration while the vehicle 100 is actually driving. Additionally, the camera calibration apparatus 110 may obtain calibration parameters of the camera 115 suitable for an actual driving environment using a pattern on the road surface without a separate calibration tool. The camera calibration apparatus 110 may implement online calibration that performs the camera calibration while the vehicle 100 is actually driving. A position and a pose angle of the camera 115 mounted on the vehicle 100 may be obtained through an operation of the camera calibration apparatus 110. The calibration parameters may be used in the ADS and/or driving assistance system of the vehicle 100.

The ADS and/or driving assistance system of the vehicle 100 may recognize objects on the road, such as, but not limited to, vehicles, people, signs, traffic lights, and lines, using an image obtained from the camera 115 as an input of a deep learning model. The recognized objects may be converted into relative positions based on the ego vehicle and used to implement various automated driving (AD) operations. In an example, the objects recognized in the image may be converted into relative positions based on the ego vehicle by only knowing camera information such as where, and in what pose, the camera 115 is mounted based on the road surface horizontal to the vehicle 100. The camera information such as the position and pose angle of the camera 115 described above may be referred to as 'calibration'.

As described in more detail below with reference to FIG. 3, the camera calibration may be a process of obtaining camera parameters indicating a corresponding relationship between a point on a real-world coordinate system and each pixel in an image coordinate system. The camera calibration may be performed to restore (e.g., estimate an actual distance from a front vehicle in an image to an ego vehicle) a world coordinate from an image or obtain a position in which a point in the world coordinate system is projected into the image. When a current environment of the vehicle 100 changes from an initial calibration environment due to certain elements (e.g., a change in the number of passengers on board, a change in the tire air pressure, and a change in the vehicle pose) during actual driving, the camera parameter may be changed, and thus, the calibration may need to be performed again. However, the calibration operation to be described hereinafter may be performed during a driving operation, and thus, the calibration environment and the actual driving environment may match and camera parameters suitable for the driving environment may be obtained.

The memory 111 may include computer-readable instructions. The processor 113 may perform operations to be described hereinafter as the instructions stored in the memory 111 are executed by the processor 113. The memory 111 may be a volatile or nonvolatile memory.

The processor 113 may be a device that executes instructions or programs, or controls respective operations of components in the camera calibration apparatus 110 and may include, as examples, hardware components of a main processor and an auxiliary processor, (e.g., a central processing unit (CPU), a graphics processing unit (GPU), and/or neural processing unit (NPU), an image signal processor, or a communication processor and/or a field programmable gate array (FGPA)).

The processor 113 may segment line regions including straight lines from a driving image. The processor 113 may extract feature points of the straight lines from the line regions. The processor 113 may project the feature points of the straight lines into a world coordinate system. The processor 113 may project the feature points of the straight lines into the world coordinate system using extrinsic parameters of the camera 115. The processor 113 may estimate an error of calibration parameters of the camera 115 including at least one of pitch, roll, or yaw so that the feature points projected into the world coordinate system satisfy a line parallel condition.

Additionally, the processor 113 may perform methods or algorithms corresponding to the methods described herein with reference to FIGS. 1 to 8. The processor 113 may execute a program and control the camera calibration apparatus 110. Code of the program executed by the processor 113 may be stored in the memory 111.

The processor 113 may be, for example, a mobile application processor (AP) but is not necessarily limited thereto. Alternatively, the processor 113 may be a processing device implemented by hardware including a circuit having a physical structure to execute desired operations. The desired operations may include, for example, code or instructions in a program. For example, the camera calibration apparatus 110 that is hardware-implemented may include a microprocessor, a CPU, a GPU, a processor core, a multi-core processor, a multiprocessor, an application-specific integrated circuit (ASIC), a field programmable gate array (FPGA), and/or an NPU.

The camera 115 may capture a driving image of, or viewed from, the vehicle 100. The camera 115 may output an image by capturing a scene in front of the vehicle, or in a driving direction of the vehicle 100. The driving image captured by the camera 115 may be transmitted to the processor 113.

Figure 3:
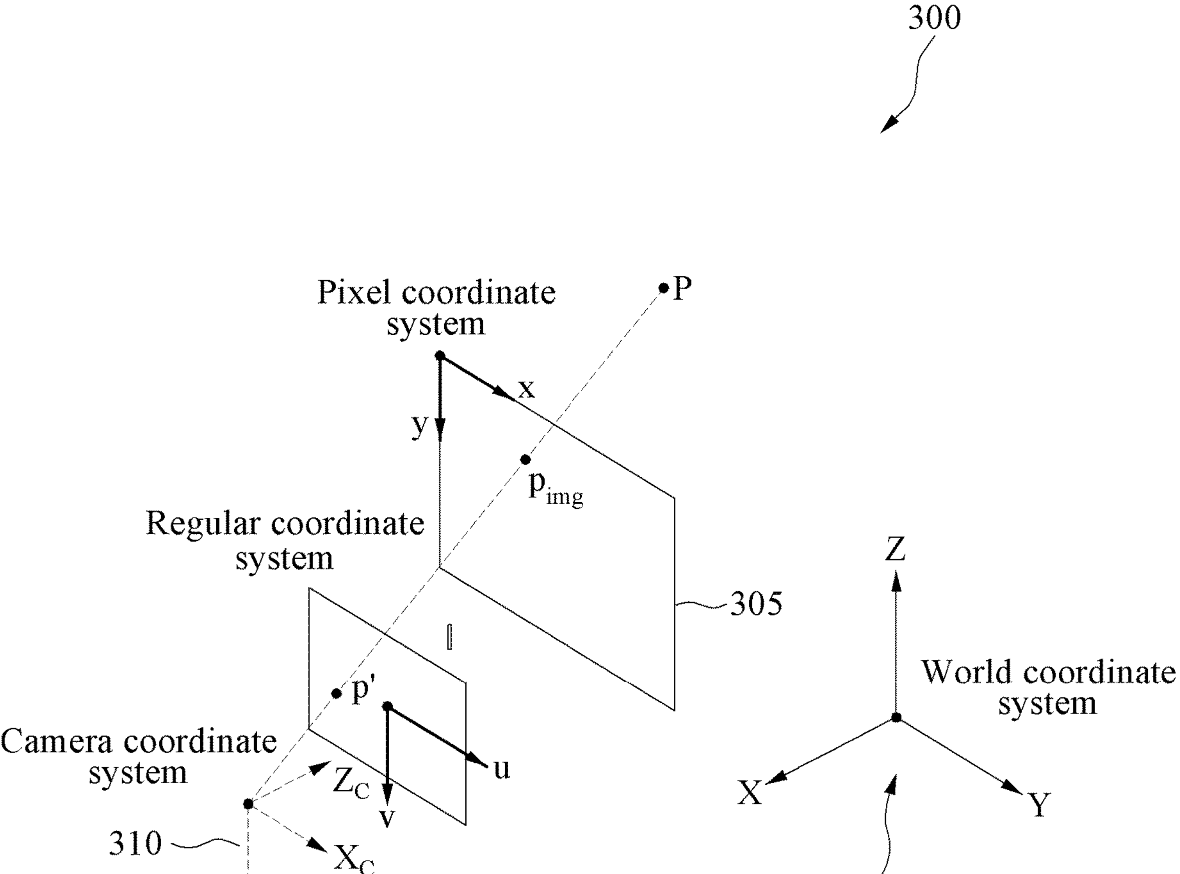
FIG. 3 illustrates an example relationship between an example camera coordinate system and a world coordinate system, in accordance with one or more embodiments.

The driving image captured by the camera 115 may be, for example, a projection of points on a 3D space of a world coordinate system 330 onto an image plane 305 of a twodimensional (2D), as shown in FIG. 3. The corresponding relationship between coordinates x and y on the 2D image and coordinates on the 3D space, that is, 3D coordinates X, Y, and Z in the world domain is described in more detail below with reference to FIG. 3.

As described in more detail below, the camera calibration apparatus 110 may adjust at least one calibration parameter among pitch, roll, and yaw of the camera 115 through a calibration operation.

The communication interface 117 may transmit an error of the calibration parameter estimated by the processor 113 to the outside of the camera calibration apparatus 110. The communication interface 117 may receive a driving image captured outside of the camera calibration apparatus 110.

The camera 115 may be included in the camera calibration apparatus 110, as shown in FIG. 1. However, the examples are not limited thereto. The description of the one or more examples may be applied even when the camera calibration apparatus 110 performs calibration by receiving an image from an external camera.

Additionally, the camera calibration apparatus 110 may be mounted on the vehicle 100, as shown in FIG. 1. However, the examples are not limited thereto. An image captured by the camera 115 mounted on the vehicle 100 may be transmitted to the camera calibration apparatus 110 disposed outside the vehicle 100, and the calibration may be performed. In this example, the camera calibration apparatus 110 may be implemented as various computing devices, for example, a mobile phone, a smartphone, a tablet, a laptop, a personal computer (PC), a remote server, and the like.

Figure 2:
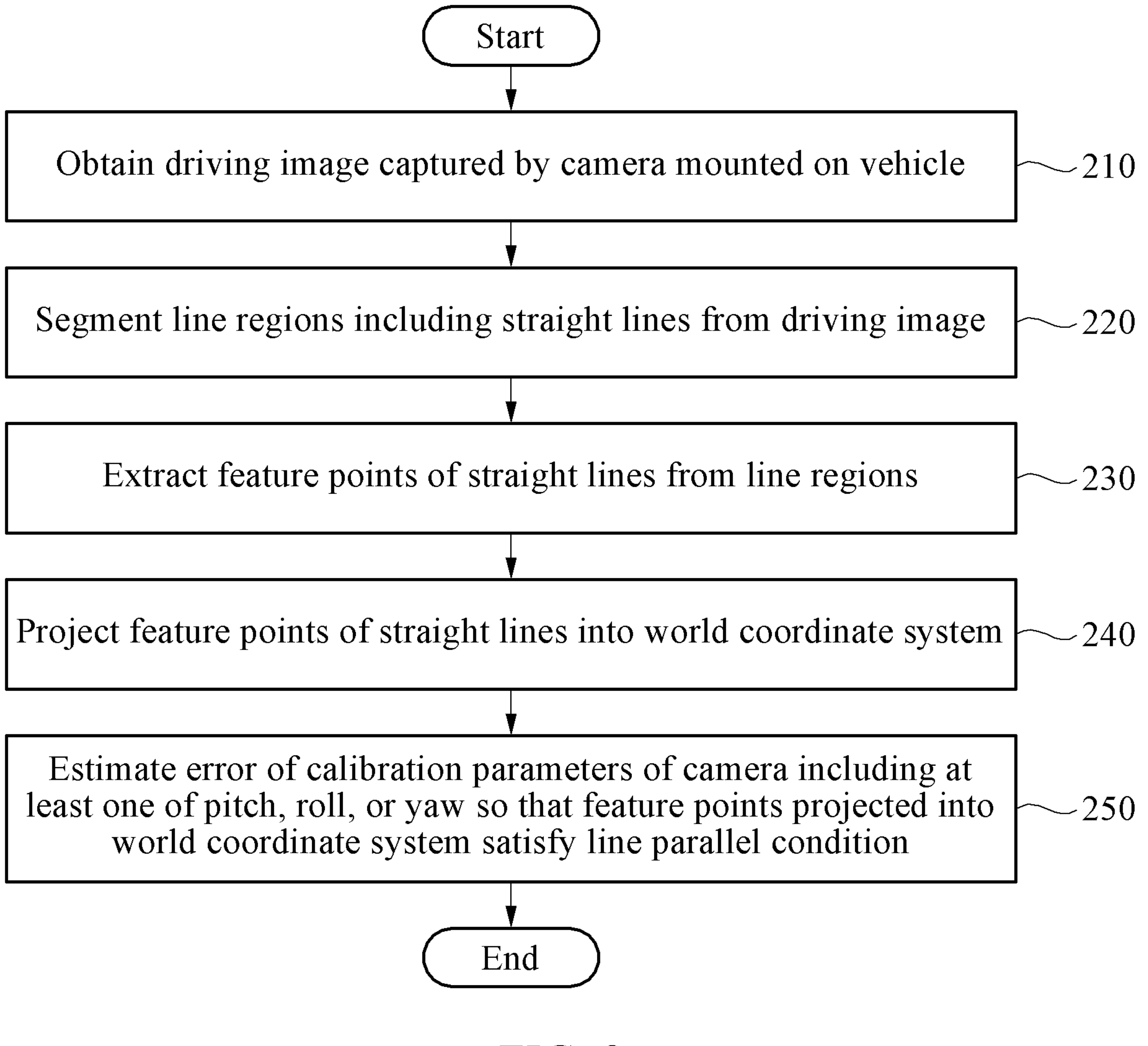
FIG. 2 illustrates an example camera calibration method, in accordance with one or more embodiments.

FIG. 2 illustrates an example of a camera calibration method, in accordance with one or more embodiments. The operations in FIG. 2 may be performed in the sequence and manner as shown. However, the order of some operations may be changed, or some of the operations may be omitted, without departing from the spirit and scope of the shown example. Additionally, operations illustrated in FIG. 2 may be performed in parallel or simultaneously. One or more blocks of FIG. 2, and combinations of the blocks, can be implemented by special purpose hardware-based computer that perform the specified functions, or combinations of special purpose hardware and instructions, e.g., computer or processor instructions. In addition to the description of FIG. 2 below, the descriptions of FIG. 1 are also applicable to FIG. 2 and are incorporated herein by reference. Thus, the above description may not be repeated here for brevity purposes. The operations of FIG. 3 may be performed by a processor. The camera calibration method may be performed by a camera calibration apparatus (e.g., the camera calibration apparatus 100 of FIG. 1) described herein, but the examples are not limited thereto.

Referring to FIG. 2, the camera calibration apparatus may estimate an error of calibration parameters of a camera through operations 210 to 250.

In operation 210, the camera calibration apparatus may obtain a driving image captured by a camera mounted on a vehicle. In an example, the driving image may include a road image and/or a road surface image including a vehicle, a line, a curb, a sidewalk, a surrounding environment, and the like. The camera calibration apparatus may obtain one driving image or a plurality of driving images by each frame by implementing an image capturing device (e.g., a camera) mounted on the front of the vehicle (e.g., an ego vehicle). In an example, it may be assumed that initial calibration information of the image capturing device is already known. In a non-limited example, the image capturing device may include a mono camera, a vision sensor, an image sensor, or a device that performs a similar operation thereto. Alternatively, the driving image may be an image that is captured by an image capturing device in the camera calibration apparatus or a device other than the camera calibration apparatus.

Since it is assumed that a vehicle is directly driving on a straight road, the camera calibration apparatus may obtain a driving image when front lines recognized in the driving image are straight lines rather than curved lines. The camera calibration apparatus may determine whether the front lines recognized in the driving image are straight lines and obtain the driving image based on the determination that the front lines are straight lines. The camera calibration apparatus may determine whether the front lines are straight lines, for example, by modeling the front lines with a polynomial and determining a coefficient of higher-order terms of 2nd-order or more in the polynomial. The camera calibration apparatus may determine the front lines as straight lines when the coefficient of higher-order terms of 2nd-order or more in the polynomial does not exist.

Alternatively, the camera calibration apparatus may determine whether a vehicle performs translational motion rather than rotational motion and when it is determined that the vehicle is in translational motion, obtain a driving image. The camera calibration apparatus may determine (or discriminate) whether the vehicle only performs translational motion by the variation in the 0th-order coefficient and the 1st-order coefficient in a polynomial that models the front lines. For example, the camera calibration apparatus may determine that the vehicle only performs translational motion when the variation in the 0th-order coefficient in the polynomial is very small and the value of the 1st-order coefficient is close to "0".

Alternatively, the camera calibration apparatus may determine whether the vehicle is in translational motion based on at least one of, for example, a measured value of an inertial measurement unit (IMU) mounted on the vehicle, wheel velocity of the vehicle, and a steering angle of the vehicle. The camera calibration apparatus may determine that the vehicle is in translational motion, for example, when the value of the lateral acceleration or the vertical axis rotational angular velocity of the IMU is close to "0" and/or when the values of the left and right wheel velocity of the vehicle are the same. Additionally, the camera calibration apparatus may determine that the vehicle is in translational motion when the steering angle of the vehicle is 0 degrees or the steering angle of the vehicle corresponds to a straight direction of the front of the vehicle.

When it is determined that the vehicle is in rotational motion, the camera calibration apparatus may not obtain a driving image or may wait to obtain the driving image until the vehicle performs translational motion.

In operation 220, the camera calibration apparatus may segment line regions including straight lines from the driving image obtained in operation 210. The camera calibration apparatus may obtain a segmentation image obtained by segmenting the line regions including the straight lines from the driving image using, for example, various known segmentation techniques and/or edge detection techniques. In an example, the camera calibration apparatus may generate the segmentation image by segmenting, by semantic units, objects from the driving image, identifying, by pixel units, the meaning of the segmented regions, and labeling the segmented regions by each class. For example, the classes may be classified into about 20 classes according to semantic units, such as a road, line, vehicle, sidewalk, pedestrian, building, and the like. The camera calibration apparatus may accurately identify where and how lines exist from labels in pixel units in the segmentation image. In addition, the camera calibration apparatus may classify the straight lines in the segmentation image using a pre-trained convolution neural network (CNN), a deep neural network (DNN), a support vector machine (SVM), and the like. The camera calibration apparatus may generate the segmentation image through a classification network including, for example, a multi-stage convolutional layer and a fully connected layer. The camera calibration apparatus may generate the segmentation image by segmenting, by semantic units, line regions from the driving image using a well-known classification network, such as AlexNet, VGGNet, and GoogleNET, identifying, by pixel units, the meaning of the segmented line regions, and labeling the segmented line regions by each class.

In operation 230, the camera calibration apparatus may extract feature points of straight lines from the line regions segmented in operation 220. The camera calibration apparatus may extract at least two feature points (e.g., two or four) of the straight lines facing each other from the line regions. Here, the 'straight lines facing each other' may be two straight lines forming one lane therebetween. When the line regions segmented in operation 220 are covered by surrounding vehicles or other objects, or at least two feature points are not extracted from the segmented line regions because the lines are worn off, the camera calibration apparatus may perform operations 210 and 220 again and extract at least two feature points of the straight lines.

The camera calibration apparatus may extract the feature points of the straight lines from the driving image using, for example, a CNN, DNN, SVM, and the like that are trained in advance to recognize the straight lines. The CNN has pre-trained various road surface marks (e.g., lines) of a road surface image and may be a region-based CNN. For example, the CNN may be trained to determine both a bounding box of the straight lines to be detected in the driving image and the type of straight lines to be detected. Additionally, the camera calibration apparatus may extract the feature points of the straight lines using various machine learning (ML) methods.

In operation 240, the camera calibration apparatus may project the feature points of the straight lines extracted in operation 230 into a world coordinate system. For example, the camera calibration apparatus may project the feature points of the straight lines extracted in operation 230 into the world coordinate system using extrinsic parameters of a camera. The camera calibration apparatus may project the feature points of the straight lines into the world coordinate system using the extrinsic parameters of the camera and a constraint condition that lines are linear lines or straight lines. The extrinsic parameters of the camera may define a position of the center of the camera and a camera direction in the world coordinate. The extrinsic parameters of the camera are, for example, parameters describing the transformation relationship between the camera coordinate system and the world coordinate system, as shown in FIG. 3 below, and may be represented as a transformation of rotation R and translation T between two coordinate systems. The rotation R and the translation T may define a coordinate system transformation from a 3D world coordinate system to a 3D camera coordinate system. The translation T may correspond to the position of an origin point of the world coordinate system represented as a coordinate of a camera-centered coordinate system. A camera position C represented in the world coordinate may be represented as $C=-R^{-1}T=-R^{t}T$ when R is a rotation matrix and T is a translation matrix.

In another example, the camera calibration apparatus may project the feature points of the straight lines extracted in operation 230 into the world coordinate system using a homography matrix. The homography matrix may represent a transformation relationship or a corresponding relationship established between corresponding points projected when one plane is projected onto another plane. The homography matrix may be determined by a camera parameter.

In operation 250, the camera calibration apparatus may estimate an error of calibration parameters of the camera including at least one of pitch, roll, or yaw so that the feature points projected into the world coordinate system in operation 240 satisfy a line parallel condition. In an example, the line parallel condition may include at least one of a first condition in which, among the feature points projected into the world coordinate system, front distances of two feature points corresponding to the same height of the straight lines facing each other are the same, a second condition in which, among the feature points projected into the world coordinate system, widths between two feature points facing each other in four feature points of a quadrangular shape are the same, or a third condition in which, among the feature points projected into the world coordinate system, y coordinates of center points of two feature points facing each other among the four feature points of a quadrangular shape are the same. The pitch, roll, and yaw are described in more detail below with reference to FIG. 4.

For example, the feature points of the straight lines may include two feature points corresponding to the same height of the straight lines facing each other. In this example, the camera calibration apparatus may calculate front distances to the front of the vehicle at each of the two feature points projected into the world coordinate system and estimate an error of the roll so that the front distances satisfy the first condition. A method of estimating the error of the roll is described in more detail below with reference to FIG. 5.

In an example, the feature points of the straight lines may include four feature points of a quadrangular shape located on the straight lines facing each other. In this example, the camera calibration apparatus may calculate widths between two feature points facing each other corresponding to the straight lines facing each other among the four feature points projected into the world coordinate system and estimate an error of the pitch so that the calculated widths satisfy the second condition. A method of estimating the error of the pitch is described in more detail below with reference to FIG. 6.

Additionally, when the feature points of the straight lines include four feature points of a quadrangular shape located on the straight lines facing each other, the camera calibration apparatus may calculate coordinates of center points of two feature points facing each other corresponding to the straight lines facing each other among the four feature points projected into the world coordinate system and estimate an error of the yaw so that the coordinates of the center points satisfy the third condition. A method of estimating the error of the yaw is described in more detail below with reference to FIG. 7.

The camera calibration apparatus may calibrate calibration parameters of the camera while the vehicle is driving using the error estimated in operation 240.

The camera calibration apparatus may update at least one of pitch, roll, and/or yaw of the camera parameters due to the error estimated through the process described above. Typically, movement in the x-axis or y-axis of the vehicle hardly changes, but pitch, roll, and/or yaw values may be changed due to a change in the tire air pressure or the weight of passengers. The camera calibration apparatus may update the changed pitch, roll, and/or yaw values through the camera calibration. However, this description does not exclude the update of parameters related to the movement in the x-axis direction or the y-axis direction.

The camera calibration apparatus may improve the deterioration of recognition of a slightly changed front object and/or the deterioration of line recognition performance while the vehicle is driving by estimating an error of the calibration parameters using a condition in which a result of projecting detected lines in the driving image into the world coordinate system using a calibration value and the detected lines are straight lines.

FIG. 3 illustrates an example relationship between a camera coordinate system and a world coordinate system, in accordance with one or more embodiments.

Referring to FIG. 3, a diagram 300 illustrates an example camera coordinate system 310 including the image plane 305 of the 2D space and the world coordinate system 330. The world coordinate system 330 may be referred to as a 'vehicle coordinate system' in that the world coordinate system 330 is based on the position of a vehicle being driven.

A driving image of a vehicle (e.g., the vehicle 100 of FIG. 1) captured by a camera (e.g., the camera 115 of FIG. 1) may be, for example, as shown in FIG. 3, a projection of points on the 3D space of the world coordinate system 330 onto the image plane 305 of 2D space. The corresponding relationship between coordinates x and y on the image plane 305 of the 2D space and the 3D space, that is, 3D coordinates X, Y, and Z in the world domain, may be expressed as in Equation 1 below.

Equation 1:

In Equation 1, A expressed as $$\begin{bmatrix} f_x & \text{skew\_cf}_x & c_x \\ 0 & f_y & c_y \\ 0 & 0 & 1 \end{bmatrix}$$

may correspond to an intrinsic parameter of a camera.

The intrinsic parameter may be an intrinsic parameter of the camera 115 itself, such as the focal length of the camera 115, an aspect ratio, and a principal point. $f_x$ and $f_y$ denote the focal length of the camera 115, cx and cy denote the principal point of the camera 115, and skew_cf$_x$ denotes a skew coefficient.

Additionally, in Equation 1, [R|t] expressed as $$\begin{bmatrix} r_{11} & r_{12} & r_{13} & t_1 \\ r_{21} & r_{22} & r_{23} & t_2 \\ r_{31} & r_{32} & r_{33} & t_3 \end{bmatrix}$$

may correspond to an extrinsic parameter of a camera. The extrinsic parameter of the camera may be a parameter related to a geometric relationship with an external space of the camera 115, such as an installation height and a direction (e.g., a pan or tilt) of the camera 115. $r_{11}$ to $r_{33}$ are elements indicating rotation of the camera 115 and may be decomposed into pitch, roll, and yaw. The pitch, roll, and yaw may be referred to as 'calibration parameters' of a camera 115 herein.

$t_1$ to $t_3$ may be elements indicating translation of the camera 115.

An image coordinate may be represented as an x-axis value and a y-axis value with respect to a reference point (e.g., the upper left end portion) of an image captured by the camera 115 and the world coordinate may be represented as an x-axis value, a y-axis value, and a z-axis value with respect to a feature point (e.g., the center of the vehicle 100) of the vehicle 100.

Figure 4:
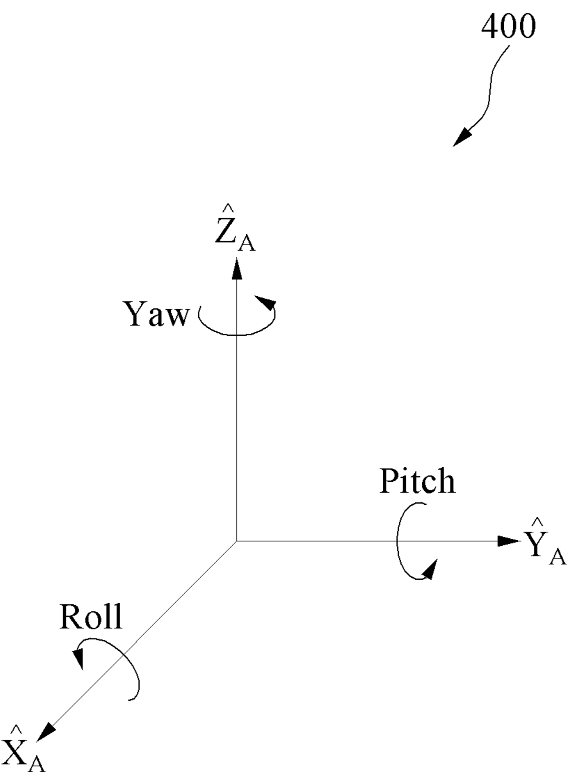
FIG. 4 illustrates an example of calibration parameters of an example camera, in accordance with one or more embodiments.

FIG. 4 illustrates an example of calibration parameters of a camera, in accordance with one or more embodiments.

Referring to FIG. 4, 400 illustrates calibration parameters of a camera.

As described above, the calibration parameters of the camera may include pitch, roll, and yaw.

The pitch may indicate rotation of the camera by an angle "r" around the horizontal Y axis, that is, movement of the camera in the up and down directions. The roll may indicate rotation of the camera by angle "b" around the vertical X axis, that is, movement of the camera in left and right tilt directions. The yaw may indicate rotation of the camera by angle "a" around the vertical Z axis, that is, movement of the camera in left and right directions.

Figure 5:
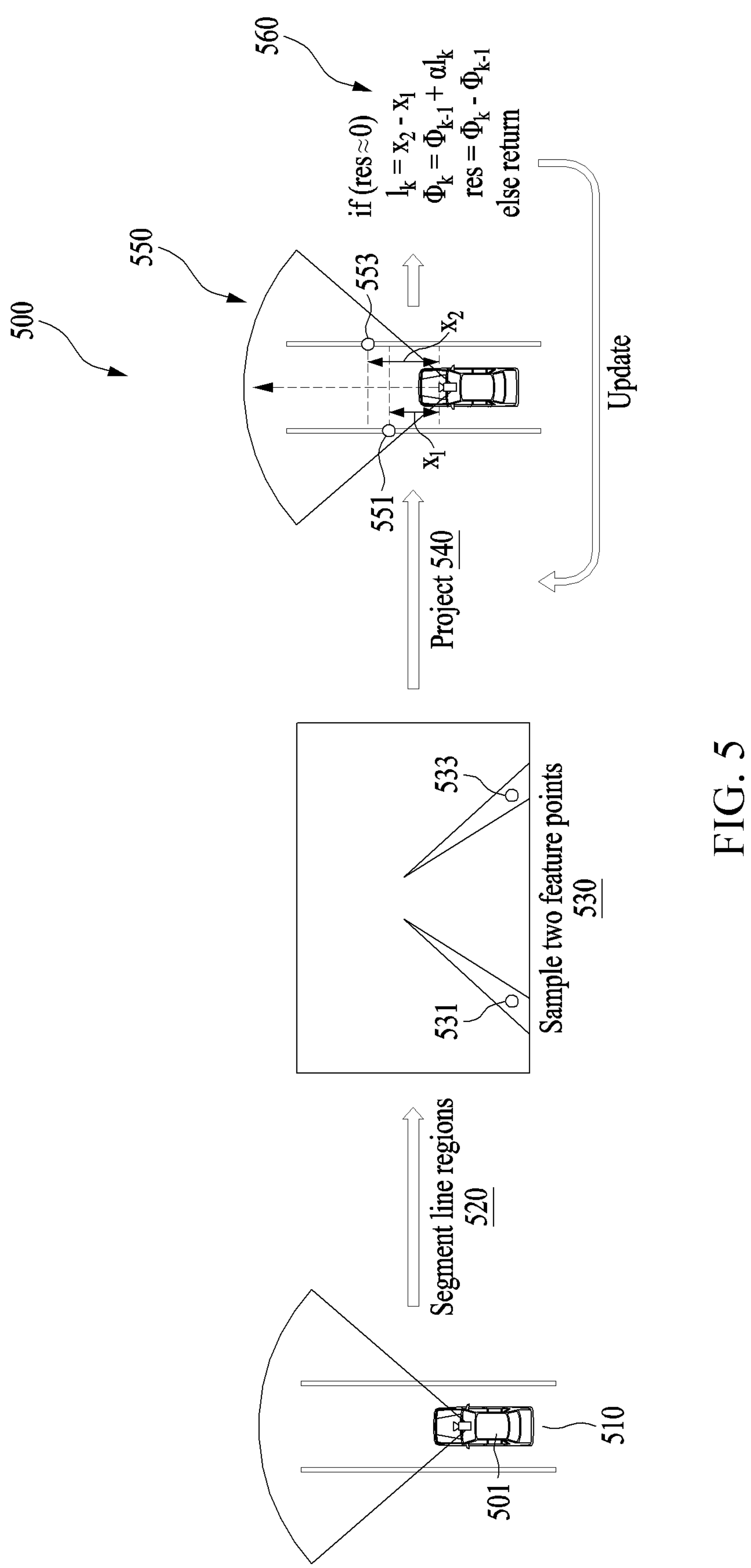
FIG. 5 illustrates an example method of estimating an error of the roll among calibration parameters of an example camera, in accordance with one or more embodiments.

FIG. 5 illustrates an example method of estimating an error of the roll among calibration parameters of a camera.

Referring to FIG. 5, 500 illustrates a process of estimating an error of a roll among calibration parameters of a camera from a driving image 510 of a vehicle 501 by a camera calibration apparatus.

In an example, it is assumed that there is no error of the roll among the calibration parameters. In this example, when feature points (e.g., feature points 531 and 533 of straight lines) of lines at the same height in the driving image 510 are projected into a world coordinate system, the distances to the front direction of the vehicle 501 may be the same from the feature points 531 and 533 of the straight lines. The camera calibration apparatus may estimate the error of the roll through optimization based on the assumption described above.

In operation 520, the camera calibration apparatus may segment line regions including straight lines from the driving image 510 using, for example, a pre-learned neural network model or a line detection algorithm.

In operation 530, the camera calibration apparatus may extract the feature points 531 and 533 of the straight lines from the segmented line regions. The feature points 531 and 533 of the straight lines may correspond to two feature points corresponding to the same height of the straight lines facing each other.

In operation 540, the camera calibration apparatus may project the two extracted feature points 531 and 533 into the world coordinate system. The result of projecting the two feature points 531 and 533 into the world coordinate system may be shown by a reference numeral 550.

A feature point 551 projected into the world coordinate system in the reference numeral 550 may be a projection of the feature point 531 of the line regions in operation 530 and a feature point 553 projected into the world coordinate system may be a projection of the feature point 533 of the line regions in operation 530.

The camera calibration apparatus may calculate the difference between X coordinates based on the world coordinate system from the two feature points 551 and 553 projected into the world coordinate system and perform optimization that calculates the error of the roll using the difference between the calculated X coordinates as a loss, as shown in Equation 560.

That is, the camera calibration apparatus may calculate front distances $X_1$ and $X_2$ to the front of the vehicle from each of the two feature points 551 and 553 projected into the world coordinate system. The camera calibration apparatus may estimate a roll value ϕk so that the difference $I_k=X_2-X_1$ between the calculated front distances $X_1$ and $X_2$ becomes minimum (e.g., "0"). That is, the camera calibration apparatus may estimate the roll value ϕk so that the calculated front distances $X_1$ and $X_2$ are the same.

The roll value $\phi_k$ may be obtained as $\phi_k=_{k-1}+aI_k$. In an example, $\phi_k$ denotes a roll value at the k time point and $\phi_{k-1}$ denotes a roll value at the k−1 time point. Additionally, α may correspond to a tuning value. The tuning value α may be adjusted adaptively. In an example, when the tuning value α is greater than a certain criterion, convergence may be fast, but an unstable result value may be obtained. When the tuning value α is less than or equal to a certain criterion, convergence may be slow but a stable result value may be obtained.

The camera calibration apparatus may repeatedly update a roll value so that the difference between the roll value $\phi_{k-1}$ at the previous k−1 time point and the roll value ϕk at the current k time point becomes minimum (e.g., "0" or a value close to "0").

The camera calibration apparatus may calibrate the calibration parameters of the camera while the vehicle is driving using the estimated error of the roll.

Figure 6:
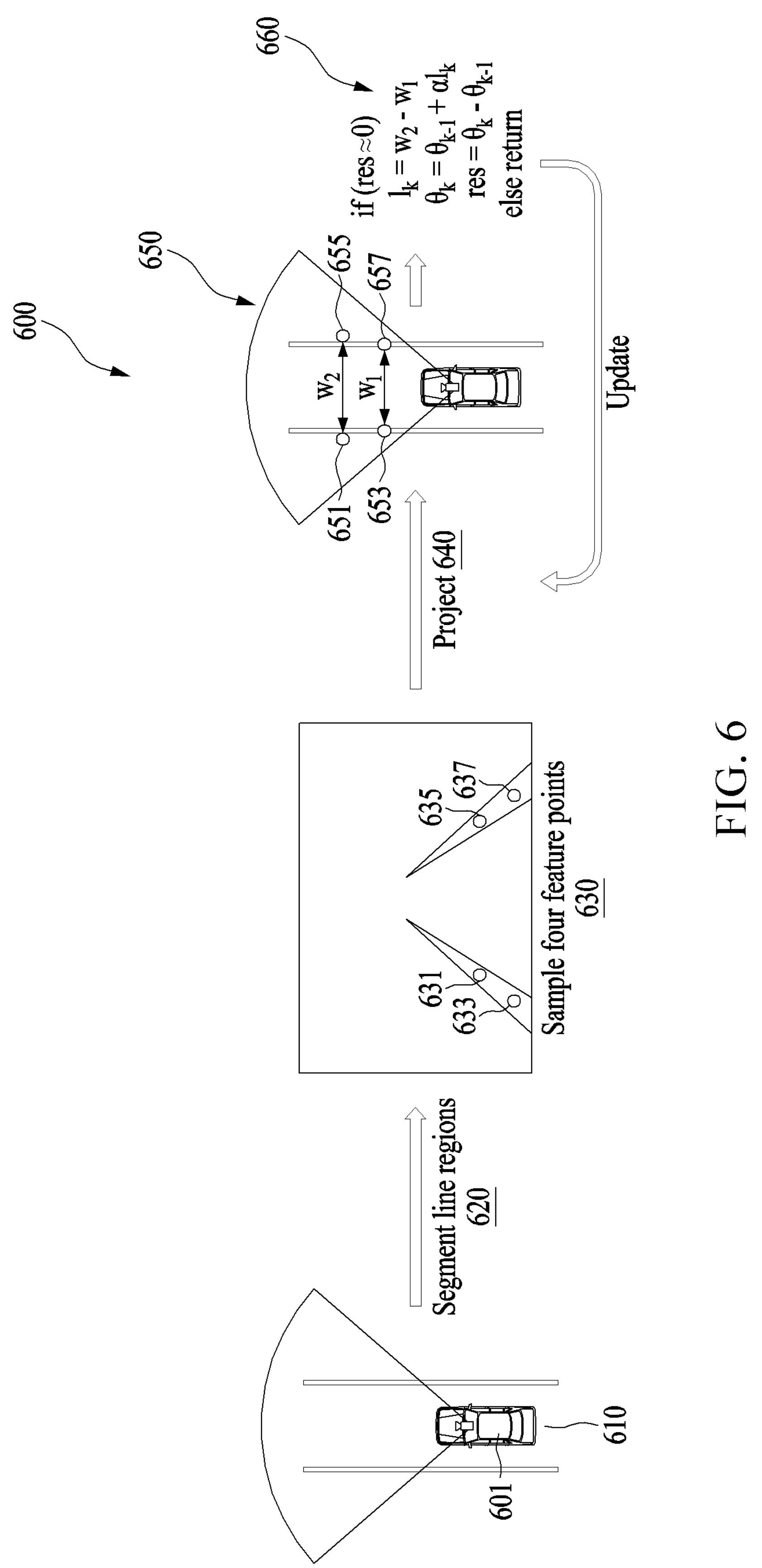
FIG. 6 illustrates an example method of estimating an error of the pitch among calibration parameters of an example camera, in accordance with one or more embodiments.

FIG. 6 illustrates an example method of estimating an error of the pitch among calibration parameters of a camera.

Referring to FIG. 6, 600 illustrates a process of estimating an error of pitch among calibration parameters of a camera from a driving image 610 of a vehicle 601 by a camera calibration apparatus.

In an example, it is assumed that there is no error of the pitch among the calibration parameters. In this example, when widths between feature points (e.g., a feature point 631 and a feature point 635, and a feature point 633 and a feature point 637) of lines facing each other extracted in operation 630 are projected into a world coordinate system, the projected feature points (e.g., a feature point 651 and a feature point 655, and a feature point 653 and a feature point 657) may also have the same width. The camera calibration apparatus may estimate the error of the pitch through optimization based on the assumption described above.

In operation 620, the camera calibration apparatus may segment line regions including straight lines from the driving image 610 using, for example, a pre-learned neural network model or a line detection algorithm.

The camera calibration apparatus may extract the feature points 631, 633, 635, and 637 of the straight lines from the segmented line regions, as shown in operation 630. The feature points 631, 633, 635, and 637 of the straight lines may correspond to four feature points of various quadrangular shapes (e.g., trapezoidal shapes) positioned on the straight lines facing each other.

In operation 640, the camera calibration apparatus may project the four extracted feature points 631, 633, 635, and 637 into the world coordinate system. A result of projecting the four feature points 631, 633, 635, and 637 into the world coordinate system may be shown by a reference numeral 650.

The feature points 651 and 655 projected into the world coordinate system in the reference numeral 650 may be respective projections of the feature point 631 of a first line and the feature point 635 of a second line facing each other in the line regions in operation 630, and the feature points 653 and 657 projected into the world coordinate system may be projections of the feature point 633 of the first line and the feature point 637 of the second line facing each other in the line regions in operation 630.

The camera calibration apparatus may calculate the line width corresponding to each distance using the four feature points 651, 653, 655, and 657 projected into the world coordinate system and perform optimization that calculates the error of the pitch using the difference between the calculated line widths as a loss, as shown in Equation 660.

The camera calibration apparatus may calculate widths between two feature points facing each other corresponding to straight lines facing each other among the four feature points 651, 653, 655, and 657 projected into the world coordinate system. The camera calibration apparatus may calculate a width $W_2$ between the feature points 651 and 655 and a width $W_1$ between the feature points 653 and 657, respectively. The camera calibration apparatus may estimate the error of the pitch based on a difference $I_k$ between the calculated widths $W_2$ and $W_1$. The camera calibration apparatus may estimate a pitch value $\theta_k$ so that the difference $I_k=W_2-W_1$ between the calculated widths $W_2$ and $W_1$ becomes minimum (e.g., "0"). That is, the camera calibration apparatus may estimate the pitch value $\theta_k$ so that the calculated widths $W_2$ and $W_1$ are the same.

The pitch value $\theta_k$ may be obtained as $\theta_k=\theta_{k-1}+aI_k$. Here, $\theta_k$ denotes a pitch value at the k time point and $\theta_{k-1}$ denotes a pitch value at the k−1 time point. Additionally, a may correspond to a tuning value. The tuning value α may be adjusted adaptively. For example, when the tuning value α is greater than a certain criterion, convergence may be fast but an unstable result value may be obtained. When the tuning value α is less than or equal to a certain criterion, convergence may be slow but a stable result value may be obtained.

The camera calibration apparatus may repeatedly update a pitch value so that the difference between the pitch value $\theta_{k-1}$ at the previous k−1 time point and the pitch value $\theta_k$ at the current k time point becomes minimum (e.g., "0" or a value close to "0").

The camera calibration apparatus may calibrate the calibration parameters of the camera while the vehicle is driving using the estimated error of the pitch.

Figure 7:
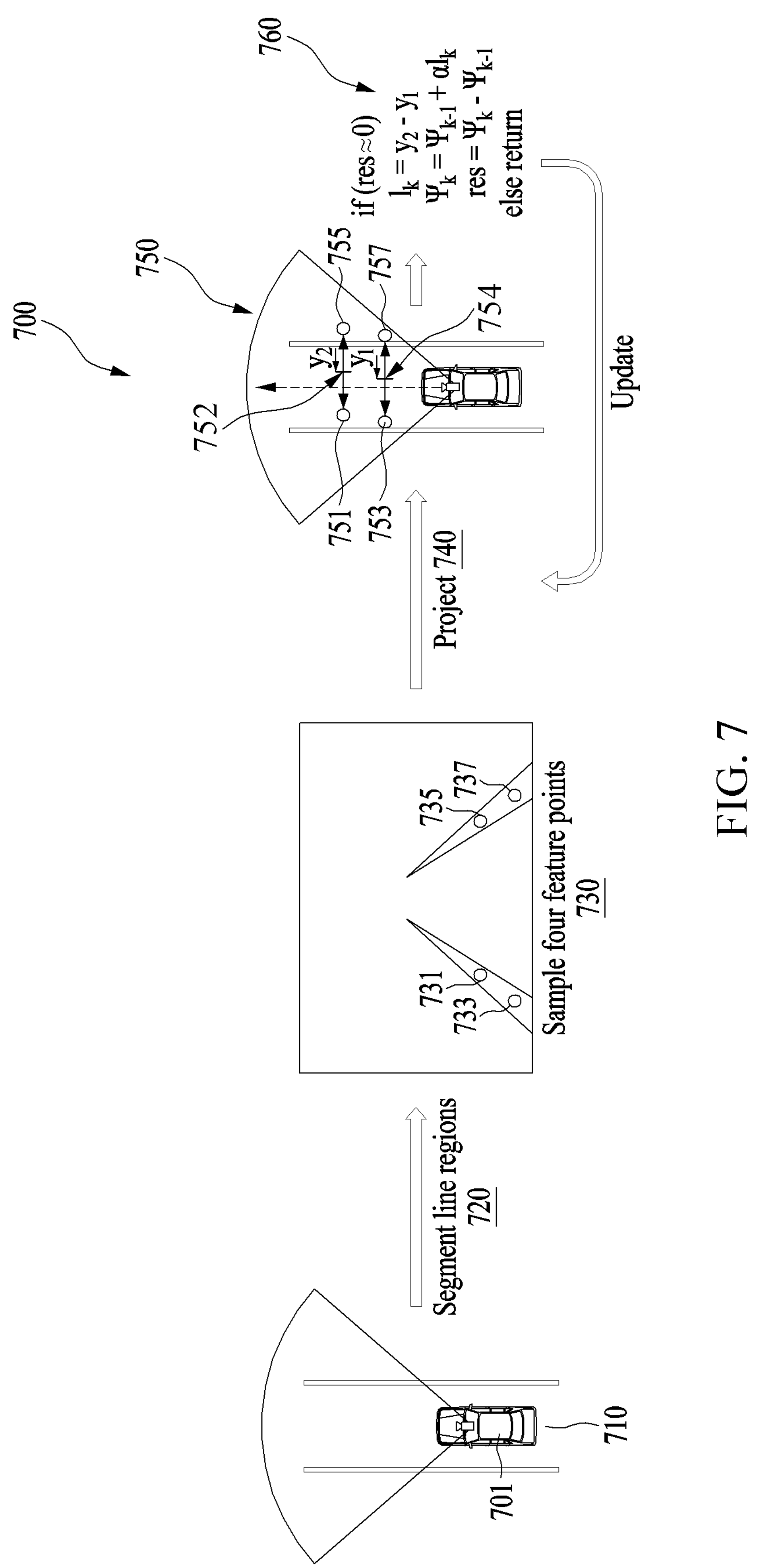
FIG. 7 illustrates an example method of estimating an error of the yaw among calibration parameters of an example camera, in accordance with one or more embodiments.

FIG. 7 illustrates an example method of estimating an error of the yaw among calibration parameters of a camera.

Referring to FIG. 7, a diagram 700 illustrates a process of estimating an error of yaw among calibration parameters of a camera from a driving image 710 of a vehicle 701 by a camera calibration apparatus.

In an example, it is assumed that there is no error of the yaw among the calibration parameters. In this example, when widths between feature points (e.g., feature point 731 and feature point 735, and feature point 733 and feature point 737) of lines facing each other extracted in operation 730 are projected into a world coordinate system, the feature points (e.g., a feature point 751 and a feature point 755, and a feature point 753 and a feature point 757) projected into a reference numeral 750 may also have the same y coordinate based on the world coordinate system. The camera calibration apparatus may estimate the error of the yaw through optimization based on the assumption described above.

In operation 720, the camera calibration apparatus may segment line regions including straight lines from the driving image 710 using, for example, a pre-learned neural network model or a line detection algorithm.

The camera calibration apparatus may extract the feature points 731, 733, 735, and 737 of the straight lines from the segmented line regions, as shown in operation 730. The feature points 731, 733, 735, and 737 of the straight lines may correspond to four feature points of various quadrangular shapes (e.g., trapezoidal shapes) positioned on the straight lines facing each other.

In operation 740, the camera calibration apparatus may project the four extracted feature points 731, 733, 735, and 737 into the world coordinate system. The result of projecting the four feature points 731, 733, 735, and 737 into the world coordinate system may be shown in the reference numeral 750.

The feature points 751 and 755 projected into the world coordinate system in the reference numeral 750 may be projections of the feature point 731 of a first lane and the feature point 735 of a second lane facing each other in the line regions in operation 730, and the feature points 753 and 757 projected into the world coordinate system may be projections of the feature point 733 of the first lane and the feature point 737 of the second lane facing each other in the line regions in operation 730.

The camera calibration apparatus may calculate the y coordinate of line centers ('center points') 752 and 754 corresponding to each distance using the four feature points 751, 753, 755, and 757 projected into the world coordinate system and perform optimization that calculates the error of the yaw using the difference between the y coordinates of the calculated line centers 752 and 754 as a loss, as shown in Equation 760.

The camera calibration apparatus may calculate y coordinates $y_1$ and $y_2$ of the center points 752 and 754 of two feature points facing each other corresponding to the straight lines facing each other among the four feature points 751, 753, 755, and 757 projected into the world coordinate system. The camera calibration apparatus may estimate the error of the yaw based on a difference $I_k$ between the y coordinates $y_1$ and $y_2$ of the center points 752 and 754. The camera calibration apparatus may estimate a yaw value $\psi_k$ so that the difference $I_k=y_2-y_1$ between the y coordinates $y_1$ and $y_2$ of the center points 752 and 754 becomes minimum (e.g., "0"). That is, the camera calibration apparatus may estimate the yaw value $\psi_k$ so that the y coordinates $y_1$ and $y_2$ of the calculated center points 752 and 754 are the same. The yaw value $\psi_k$ may be obtained as $\psi_k=\psi_k-1+aI_k$. In an example, $\psi_k$ denotes the yaw value at the k time point and $\psi_{k-1}$ denotes the yaw value at the k−1 time point. Additionally, a may correspond to a tuning value. The tuning value $\alpha$ may be adjusted adaptively. In an example, when the tuning value $\alpha$ is greater than a certain criterion, convergence may be fast but an unstable result value may be obtained. When the tuning value $\alpha$ is less than or equal to a certain criterion, convergence may be slow but a stable result value may be obtained.

The camera calibration apparatus may repeatedly update a yaw value so that the difference between the yaw value $\psi_{k-1}$ at the previous k−1 time point and the yaw value $\psi_k$ at the current k time point becomes minimum (e.g., "0" or a value close to "0").

The camera calibration apparatus may calibrate the calibration parameters of the camera while the vehicle is driving using the estimated error of the yaw.

Figure 8:
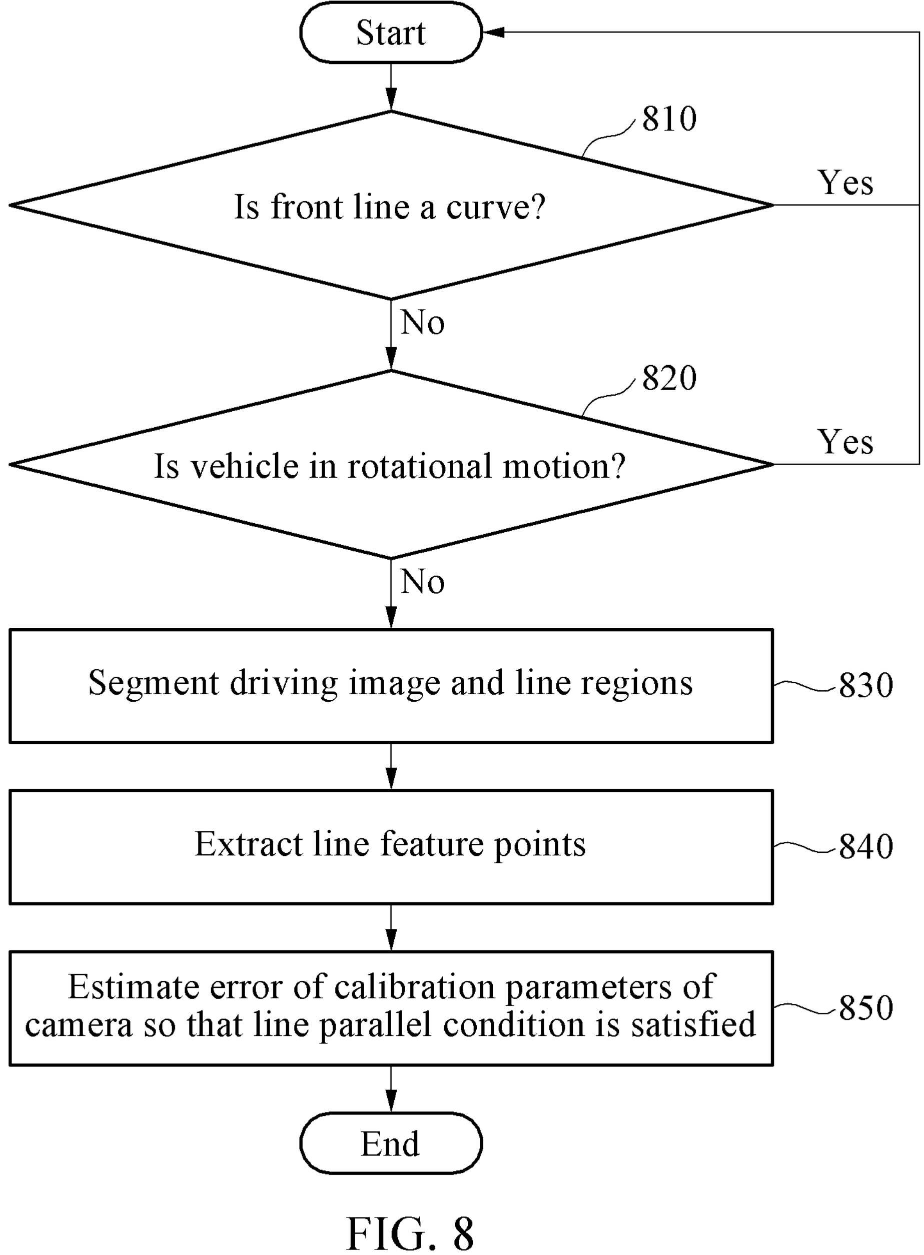
FIG. 8 illustrates an example camera calibration method, in accordance with one or more embodiments.

FIG. 8 illustrates an example camera calibration method, in accordance with one or more embodiments. The operations in FIG. 8 may be performed in the sequence and manner as shown. However, the order of some operations may be changed, or some of the operations may be omitted, without departing from the spirit and scope of the shown example. Additionally, operations illustrated in FIG. 8 may be performed in parallel or simultaneously. One or more blocks of FIG. 8, and combinations of the blocks, can be implemented by special purpose hardware-based computer that perform the specified functions, or combinations of special purpose hardware and instructions, e.g., computer or processor instructions. In addition to the description of FIG. 8 below, the descriptions of FIGS. 1-7 are also applicable to FIG. 8 and are incorporated herein by reference. Thus, the above description may not be repeated here for brevity purposes. The operations of FIG. 8 may be performed by a processor. The camera calibration method may be performed by a camera calibration apparatus (e.g., the camera calibration apparatus 100 of FIG. 1) described herein but is not necessarily limited thereto.

Referring to FIG. 8, a camera calibration apparatus may estimate an error of calibration parameters of a camera through operations 810 to 850.

The camera calibration method may be operated based on the assumption that a vehicle is driving straight on a straight road. Accordingly, the camera calibration apparatus may first determine whether the front line is a straight line and/or whether a vehicle is in rotational motion and then estimate an error of the calibration parameters of the camera.

In operation 810, the camera calibration apparatus may determine whether the front line of a driving image is a curve. The camera calibration apparatus may determine whether the front lines are straight lines by modeling the front lines with a polynomial and determining a coefficient of higher-order terms of 2nd-order or more in the polynomial. The camera calibration apparatus may determine the front lines as the straight lines when a coefficient of higher-order terms of 2nd-order or more in the polynomial does not exist.

In operation 810, when it is determined that the front line is a curve, the camera calibration apparatus may wait until a front line that is not a curve is input the camera calibration apparatus or may obtain a new driving image.

In operation 810, when it is determined that the front line is not a curve, in operation 820, the camera calibration apparatus may determine whether the vehicle is in rotational motion. In operation 820, when it is determined that the vehicle is in rotational motion, the camera calibration apparatus may wait until the vehicle performs translational motion rather than rotational motion or may obtain a new driving image.

In operation 820, the camera calibration apparatus may determine whether the vehicle only performs translational motion. The camera calibration apparatus may determine whether the vehicle only performs translational motion based on the variation in the 0th-order coefficient and 1st-order order in the polynomial that models the front lines. Alternatively, the camera calibration apparatus may determine whether the vehicle only performs translational motion based on an IMU mounted on the vehicle, wheel velocity of the vehicle, a steering angle of the vehicle, and the like.

In operation 820, when it is determined that the vehicle is not in rotational motion, in operation 830, the camera calibration apparatus may capture a driving image and segment line regions from the captured driving image.

In operation 840, the camera calibration apparatus may extract line feature points from the line regions segmented in operation 830. The line feature points may correspond to the feature points of the straight lines described above.

In operation 850, the camera calibration apparatus may estimate an error of calibration parameters (e.g., pitch, roll, and/or yaw) of the camera so that the line feature points extracted in operation 840 satisfy a line parallel condition. In an example, a gradient descent method that repeatedly improves an error by reducing the error and various other optimization techniques may be used for optimization that is performed in a process of estimating the error of the pitch, roll, and/or yaw.

The camera calibration apparatus 110, memory 111, processor 113, camera 115, communication interface 117, and other components and devices of FIGS. 1-8, and other circuitries, components or devices described herein are implemented as, and by, hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to control the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application, and illustrated in FIGS. 1-8, are performed by computing hardware, for example, by one or more processors or computers, implemented as described above executing instructions or software to control the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller, e.g., as respective operations of processor implemented methods. One or more processors, or a processor and a controller, may perform a single operation, or two or more operations.

Instructions or software to control computing hardware, for example, one or more processors or computers, to control the neural network circuits or circuitry to perform the methods as described above may be written as computer programs, code segments, instructions or any combination thereof, for individually or collectively instructing or configuring the one or more processors or computers to operate as a machine or special-purpose computer to perform such control of the operations that be performed by the neural network circuits or circuitry and the methods as described above. In one example, the instructions or software include machine code that is directly executed by the one or more processors or computers, such as machine code produced by a compiler. In another example, the instructions or software include higher-level code that is executed by the one or more processors or computers using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the control of hardware components to perform the methods as described above, and any associated data, data files, and data structures, may be recorded, stored, or fixed in or on one or more non-transitory computer-readable storage media, such as in memory 111 of FIG. 1. Examples of a non-transitory computer-readable storage medium include read-only memory (ROM), random-access programmable read only memory (PROM), EEPROM, RAM, DRAM, SRAM, flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors and computers so that the one or more processors and computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A processor-implemented method for updating an initial calibration parameter of a camera, the method comprising:
- obtaining a driving image captured by the camera mounted on a vehicle, wherein the initial calibration parameter of the camera comprises at least one of a pitch, a roll, or a yaw;
- segmenting line regions comprising straight lines from the captured driving image;
- extracting feature points of the straight lines from the line regions;
- projecting the extracted feature points into a world coordinate system;
- estimating an error of the initial calibration parameter of the camera so that the projected feature points satisfy a line parallel condition in the world coordinate system,
- wherein the satisfaction of the line parallel condition in the world coordinate system includes one or more determined geometric differences, between two or more of the projected feature points, in the world coordinate system meeting a corresponding predetermined geometric condition in the world coordinate system.

2. The method of claim 1, wherein the obtaining of the driving image comprises:
- determining whether front lines recognized in the driving image are the straight lines; and
- obtaining the driving image based on a result of the determining that the front lines are the straight lines.

3. The method of claim 2, wherein the determining of whether the front lines are the straight lines comprises:
- modeling the front lines with a polynomial; and
- determining whether the front lines are the straight lines by determining a coefficient of higher-order terms of 2nd-order or more in the polynomial.

4. The method of claim 1, wherein the obtaining of the driving image comprises:
- determining whether the vehicle is in a translational motion or a rotational motion; and
- obtaining the driving image based on a determination that the vehicle is in the translational motion.

5. The method of claim 4, wherein the determining of whether the vehicle is in the translational motion comprises determining whether the vehicle is in the translational motion based on at least one of a measured value of an inertial measurement unit (IMU) mounted on the vehicle, a wheel velocity of the vehicle, or a steering angle of the vehicle.

6. The method of claim 1, wherein the line parallel condition comprises at least one of:
- a first condition in which, among the projected feature points, front distances of two feature points corresponding to a same height of straight lines facing each other are determined equal;
- a second condition in which, among the projected feature points, widths between two feature points facing each other in four feature points of a quadrangular shape are determined equal; and
- a third condition in which, among the four feature points, y coordinates of center points of two feature points facing each other are determined equal.

7. The method of claim 6, wherein:
- the feature points of the straight lines comprise two feature points corresponding to the same height of straight lines facing each other, and
- the estimating of the error comprises:
  - calculating front distances to a front of the vehicle from each of the two feature points projected into the world coordinate system; and
  - estimating an error of the roll so that the front distances satisfy the first condition.

8. The method of claim 6, wherein:
- the feature points of the straight lines comprise four feature points of a quadrangular shape located on straight lines facing each other, and
- the estimating of the error comprises:
  - calculating widths between two feature points facing each other corresponding to straight lines facing each other among the four feature points projected into the world coordinate system; and
  - estimating an error of the pitch so that the widths satisfy the second condition.

9. The method of claim 6, wherein:
- the feature points of the straight lines comprise four feature points of a quadrangular shape located on straight lines facing each other, and
- the estimating of the error comprises:
  - calculating coordinates of center points of two feature points facing each other corresponding to straight lines facing each other among the four feature points projected into the world coordinate system; and
  - estimating an error of the yaw so that the coordinates of the center points satisfy the third condition.

10. The method of claim 1, further comprising:
- updating the initial calibration parameter of the camera while the vehicle is driving based on the estimated error.

11. A non-transitory computer-readable storage medium storing instructions that, when executed by a processor, cause the processor to perform the method of claim 1.

12. An apparatus for updating an initial calibration parameter of a camera, comprising:
- the camera configured to capture a driving image of a vehicle, wherein the initial calibration parameter of the camera comprises at least one of a pitch, a roll, or a yaw; and
- a processor configured to:
  - segment line regions comprising straight lines from the captured driving image of the vehicle;
  - extract feature points of the straight lines from the line regions;
  - project the extracted feature points into a world coordinate system; and
  - estimate an error of the initial calibration parameter of the camera so that the projected feature points satisfy a line parallel condition in the world coordinate system, wherein the satisfaction of the line parallel condition in the world coordinate system includes one or more determined geometric differences, between two or more of the projected feature points, in the world coordinate system meeting a corresponding predetermined geometric condition in the world coordinate system.

13. The apparatus of claim 12, wherein the processor is configured to determine whether front lines recognized in the driving image are the straight lines and obtain the driving image based on a result of the determination that the front lines are the straight lines.

14. The apparatus of claim 13, wherein the processor is configured to model the front lines with a polynomial and determine whether the front lines are the straight lines by determining a coefficient of higher-order terms of 2nd-order or more in the polynomial.

15. The apparatus of claim 12, wherein the processor is configured to determine whether the vehicle is in a translational motion based on at least one of a measured value of an inertial measurement unit (IMU) mounted on the vehicle, a wheel velocity of the vehicle, or a steering angle of the vehicle and obtain the driving image based on a determination that the vehicle is in the translational motion.

16. The apparatus of claim 12, wherein the line parallel condition comprises at least one of:

a first condition in which, among the projected feature points, front distances of two feature points corresponding to a same height of straight lines facing each other are determined equal;

a second condition in which, among the projected feature points, widths between two feature points facing each other in four feature points of a quadrangular shape are determined equal; and a third condition in which, among the four feature points, y coordinates of center points of two feature points facing each other are determined equal.

17. The apparatus of claim 16, wherein:

the feature points of the straight lines comprise two feature points corresponding to the same height of straight lines facing each other, and the processor is configured to calculate front distances to a front of the vehicle from each of the two feature points projected into the world coordinate system and estimate an error of the roll so that the front distances satisfy the first condition.

18. The apparatus of claim 16, wherein:

the feature points of the straight lines comprise four feature points of a quadrangular shape located on straight lines facing each other, and the processor is configured to calculate widths between two feature points facing each other corresponding to straight lines facing each other among the four feature points projected into the world coordinate system and estimate an error of the pitch so that the widths satisfy the second condition.

19. The apparatus of claim 16, wherein:

the feature points of the straight lines comprise four feature points of a quadrangular shape located on straight lines facing each other, and the processor is configured to calculate coordinates of center points of two feature points facing each other corresponding to straight lines facing each other among the four feature points projected into the world coordinate system and estimate an error of the yaw so that the coordinates of the center points satisfy the third condition.

20. The apparatus of claim 19, wherein the processor is configured to update the initial calibration parameter of the camera while the vehicle is driving based on the estimated error.

21. The method of claim 1, wherein the satisfaction of the line parallel condition, in the world coordinate system, by the projected feature points represents a confirmation that the straight lines are parallel to each other in the world coordinate system.

* * * * *